United States Patent
Xia et al.

(10) Patent No.: US 12,366,454 B2
(45) Date of Patent: Jul. 22, 2025

(54) NAVIGATION METHOD AND SYSTEM, CLOUD SERVER, MOBILE TERMINAL, ELECTRONIC DEVICE AND MEDIUM

(71) Applicants: Beijing BOE Technology Development Co., Ltd., Beijing (CN); BOE TECHNOLOGY GROUP CO., LTD., Beijing (CN)

(72) Inventors: Youxiang Xia, Beijing (CN); Shuobin Liang, Beijing (CN); Honglei Zhang, Beijing (CN); Xiao Chu, Beijing (CN); Hongbo Feng, Beijing (CN); Yangyang Zhang, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/028,056

(22) PCT Filed: Mar. 29, 2022

(86) PCT No.: PCT/CN2022/083648
§ 371 (c)(1),
(2) Date: Mar. 23, 2023

(87) PCT Pub. No.: WO2023/184146
PCT Pub. Date: Oct. 5, 2023

(65) Prior Publication Data
US 2024/0302173 A1 Sep. 12, 2024

(51) Int. Cl.
*G01C 21/34* (2006.01)

(52) U.S. Cl.
CPC ............. *G01C 21/3415* (2013.01)

(58) Field of Classification Search
CPC .................................. G01C 21/3415
See application file for complete search history.

(56) References Cited

U.S. PATENT DOCUMENTS

2010/0100309 A1* 4/2010 Hosoi ............... G01C 21/3446
701/532
2014/0343845 A1 11/2014 Choi et al.
(Continued)

FOREIGN PATENT DOCUMENTS

CN 101526359 A 9/2009
CN 102183258 A 9/2011
(Continued)

OTHER PUBLICATIONS

Guo et al., "A Deep Relevance Matching Model for Ad-hoc Retrieval," Conference Paper, Oct. 24, 2016, pp. 55-64, CIKM'16: Proceedings of The 2016 ACM Conference on Information and Knowledge Management, Indianapolis, IN, USA.

*Primary Examiner* — Adnan M Mirza
(74) *Attorney, Agent, or Firm* — HOUTTEMAN LAW LLC

(57) ABSTRACT

The present disclosure provides a navigation method applied to a cloud server. The method includes: determining a global route between a starting point and a destination in response to navigation request information transmitted by a mobile terminal, the navigation request information includes at least information of starting point and destination; transmitting the global route to the mobile terminal to guide the user to drive according to the global route; acquiring a current position of the mobile terminal in response to road abnormality information transmitted by the mobile terminal in the driving process of the user; acquiring a shared route in the cloud server, and generating at least one corrected route from the current position to the destination; the corrected route is different from an original remaining route. The (Continued)

present disclosure also provides a cloud server, a mobile terminal, a navigation system, an electronic device, and a computer-readable medium.

19 Claims, 8 Drawing Sheets

(56) References Cited

U.S. PATENT DOCUMENTS

| | | | |
|---|---|---|---|
| 2015/0168164 A1* | 6/2015 | Patil | H04W 4/029 |
| | | | 455/421 |
| 2021/0009161 A1* | 1/2021 | Kim | H04W 4/40 |
| 2021/0215494 A1 | 7/2021 | Xia et al. | |

FOREIGN PATENT DOCUMENTS

| | | | | |
|---|---|---|---|---|
| CN | 102186137 A | 9/2011 | | |
| CN | 102706354 A | 10/2012 | | |
| CN | 102829790 A | 12/2012 | | |
| CN | 105890607 A | 8/2016 | | |
| CN | 106032986 A | 10/2016 | | |
| CN | 205957981 U | 2/2017 | | |
| CN | 110118563 A | 8/2019 | | |
| CN | 211121256 U | 7/2020 | | |
| CN | 111739308 A | 10/2020 | | |
| CN | 113267197 A | 8/2021 | | |
| CN | 113763694 A | 12/2021 | | |
| EP | 3816888 A2 * | 5/2021 | | G05D 1/0214 |
| JP | 2002048573 A | 2/2002 | | |
| KR | 20130106280 A | 9/2013 | | |

\* cited by examiner

Determining a global route between the starting point and the destination according to the map information stored in the cloud server in response to the navigation request information transmitted by the mobile terminal — S11 (S11a)

FIG. 3

Determining a first alternative global route between the starting point and the destination according to the map information stored in the cloud server — S11b1

Selecting at least one second alternative global route from a plurality of shared routes shared by other mobile terminals to the cloud server — S11b2

Fitting the first alternative global route and the at least one second alternative global route to obtain the global route — S11b3

NAVIGATION METHOD AND SYSTEM, CLOUD SERVER, MOBILE TERMINAL, ELECTRONIC DEVICE AND MEDIUM

TECHNICAL FIELD

The present disclosure relates to the field of vehicle networking technology, and in particular to a navigation method, a cloud server, a mobile terminal, a navigation system, an electronic device and a computer readable medium.

BACKGROUND

Currently, the automatic driving or the manual driving can't do without the map navigation, and a planned route is based on map information stored in a system. However, in some cases, the map information is not updated timely due to uncertain factors such as temporary road repair or the like, so that the planned driving route cannot avoid an impassable road, which affects the driving experience of a user.

SUMMARY

The present disclosure is directed to at least one of the technical problems in the prior art, and provides a navigation method, a cloud server, a mobile terminal, a navigation system, an electronic device, and a computer-readable medium.

To achieve the above objects, the present disclosure provides a navigation method for a cloud server, including: determining a global route between a starting point and a destination in response to navigation request information transmitted by a mobile terminal, the navigation request information includes at least information regarding the starting point and the destination: transmitting the global route to the mobile terminal, to guide a user to drive according to the global route: acquiring a current position of the mobile terminal in response to road abnormality information transmitted by the mobile terminal in the driving process of the user; and acquiring a shared route in the cloud server, and generating at least one corrected route from the current position to the destination: wherein the corrected route is different from an original remaining route, and the original remaining route is a part of the global route between the current position of the mobile terminal and the destination.

In some embodiments, the acquiring the shared route in the cloud server, and generating the at least one corrected route from the current position to the destination, includes: acquiring at least one related route passing through the current position and a target node from the shared route in the cloud server, wherein the target node is the destination or a key road node positioned on the original remaining route: taking a portion of the related route between the current position and the target node as the corrected route when the target node is the destination: and generating the corrected route according to the portion of the related route between the current position and the target node and the portion of the original remaining route between the target node and the destination when the target node is the key road node.

In some embodiments, before the acquiring the at least one related route passing through the current position and the target node, the navigation method further includes: detecting whether the abnormal road segment exists on the original remaining route: and detecting the region where the abnormal road segment is located in response to the abnormal road segment existing on the original remaining route: and wherein the target node passed by the related route is located outside the abnormal road segment.

In some embodiments, the navigation method further includes: acquiring road condition information of the original remaining route and road condition information of each corrected route: determining estimated passing time for the original remaining route according to the road condition information of the original remaining route: determining the estimated passing time for each corrected route according to the road condition information of each corrected route: determining average passing time of all the corrected routes according to the estimated passing time for each corrected route: and transmitting the at least one corrected route to the mobile terminal in response to a ratio of the estimated passing time to the average passing time for the original remaining route exceeds a preset threshold.

In some embodiments, the transmitting the at least one corrected route to the mobile terminal, includes: selecting one of all the corrected routes as a recommended route according to a preset rule, and transmitting the recommended route to the mobile terminal.

In some embodiments, the transmitting the at least one corrected route to the mobile terminal, includes: transmitting all the corrected routes to the mobile terminal; selecting one of all the corrected routes as a recommended route in response to route selection information transmitted by the mobile terminal: and transmitting the recommended route to the mobile terminal.

In some embodiments, the navigation method further includes: generating a characteristic tag of each corrected route according to the road condition information of each corrected route: and wherein when all the corrected routes are transmitted to the mobile terminal, the characteristic tag of each corrected route is transmitted to the mobile terminal:

In some embodiments, when the ratio of the estimated passing time to the average passing time of the original remaining route exceeds the preset threshold, the navigation method further includes: generating reminding information according to the estimated passing time and the average passing time of the original remaining route, and transmitting the reminding information to the mobile terminal.

In some embodiments, the determining the global route between the starting point and the destination, includes: determining the global route between the starting point and the destination according to map information stored in the cloud server.

In some embodiments, the determining the global route between the starting point and the destination, includes: determining a first alternative global route between the starting point and the destination according to the map information stored in the cloud server: selecting at least one second alternative global route from a plurality of shared routes in the cloud server, wherein the second alternative global route passes through a region defined by taking the destination as a center and a preset value as a radius: and fitting the first alternative global route and at least one second alternative global route to obtain the global route.

In some embodiments, the navigation request information further includes: position information of at least one intermediate node between the starting point and the destination: the determining the global route between the starting point and the destination, including: determining the first alternative global route between the starting point and the destination according to the map information stored in the cloud server: judging whether the first alternative global route passes through each intermediate node: taking the first alternative global route as the global route, in response to the first alternative global route passing through each intermediate node; and selecting at least one second alternative global route from the plurality of shared routes in the cloud server: and fitting the at least one second alternative global route with the first alternative global route to generate the global route passing through each intermediate node, in response to the first alternative global route not passing through each intermediate node.

In some embodiments, the navigation method further includes: updating the stored map information according to the route shared by the mobile terminal in response to navigation end information.

An embodiment of the present disclosure further provides a navigation method for a mobile terminal, the navigation method includes: transmitting navigation request information to a cloud server according to navigation instruction input by a user, so that the cloud server determines a global route between a starting point and a destination: the navigation request information includes at least information regarding the starting point and the destination: receiving the global route transmitted by the cloud server: and transmitting road abnormality information to the cloud server in response to driving abnormality stop information, so that the cloud server acquires a current position of the mobile terminal and a shared route in the cloud server in response to the road abnormality information to generate at least one corrected route from the current position to the destination: wherein the at least one corrected route is different from an original remaining route, the original remaining route is a portion of the global route between the current position and the destination.

In some embodiments, the navigation method further includes: receiving the corrected route transmitted by the cloud server: outputting an instruction acquisition request to request the user to input a selection instruction: transmitting route selection information to the cloud server in response to the selection instruction input by the user, so that the cloud server selects one of all the corrected routes as the recommended route: and receiving the recommended route transmitted by the cloud server.

In some embodiments, the navigation method further includes: outputting shared request information in response to navigation end information: and transmitting at least a part of an actual driving route to the cloud server in response to confirmation sharing information input by the user.

An embodiment of the present disclosure further provides a cloud server, including: a global route determining module configured to determine a global route between a starting point and a destination in response to navigation request information transmitted by a mobile terminal, the navigation request information includes at least information regarding the starting point and the destination: a global route transmitting module configured to transmit the global route to the mobile terminal to guide a user to drive according to the global route: and a corrected route generating module configured to acquire a current position of the mobile terminal in response to road abnormality information transmitted by the mobile terminal in the driving process of the user: acquire a shared route in the cloud server, and generate at least one corrected route from the current position to the destination: wherein the corrected route is different from an original remaining route, and the original remaining route is a part of the global route between the current position of the mobile terminal and the destination.

An embodiment of the present disclosure further provides a mobile terminal, including: a request transmitting module configured to transmit navigation request information to a cloud server according to navigation instruction input by a user, so that the cloud server determines a global route between a starting point and a destination: the navigation request information includes at least information regarding the starting point and the destination: a route receiving module configured to receive the global route transmitted by the cloud server: an abnormality information transmitting module configured to transmit road abnormality information to the cloud server in response to driving abnormality stop information, so that the cloud server acquires a current position of the mobile terminal in response to the road abnormality information, acquire a shared route in the cloud server, and generate at least one corrected route from the current position to the destination: and wherein the corrected route is different from an original remaining route, and the original remaining route is a part of the global route between the current position of the mobile terminal and the destination.

An embodiment of the present disclosure further provides a navigation system, including: the cloud server and the mobile terminal.

An embodiment of the present disclosure further provides an electronic device, including: one or more processors: a storage device having one or more programs stored thereon which, when executed by the one or more processors, cause the one or more processors to implement the method: and one or more I/O interfaces connected between the one or more processors and the memory and configured to enable information interaction between the one or more processors and the memory.

An embodiment of the present disclosure further provides a computer-readable medium, on which a computer program is stored, and implements the above method when executed by a processor.

BRIEF DESCRIPTION OF DRAWINGS

The accompanying drawings, which are provided for further understanding of embodiments of the present disclosure and constitute a part of this specification, are for explaining the present disclosure together with the embodiments of the present disclosure, but are not intended to limit the present disclosure. In the drawings:

FIG. 3 is a schematic flow chart of step S11 provided in one example of the present disclosure.

FIG. 4 is a schematic flow chart of step S11 provided in another example of the present disclosure.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items.

The embodiment of the present disclosure provides a navigation method, which is applied to a navigation system, the navigation system includes a cloud server and a mobile terminal communicating with the cloud server, and the mobile terminal may be a vehicle-mounted terminal, a mobile phone or the like.

Figure 1:
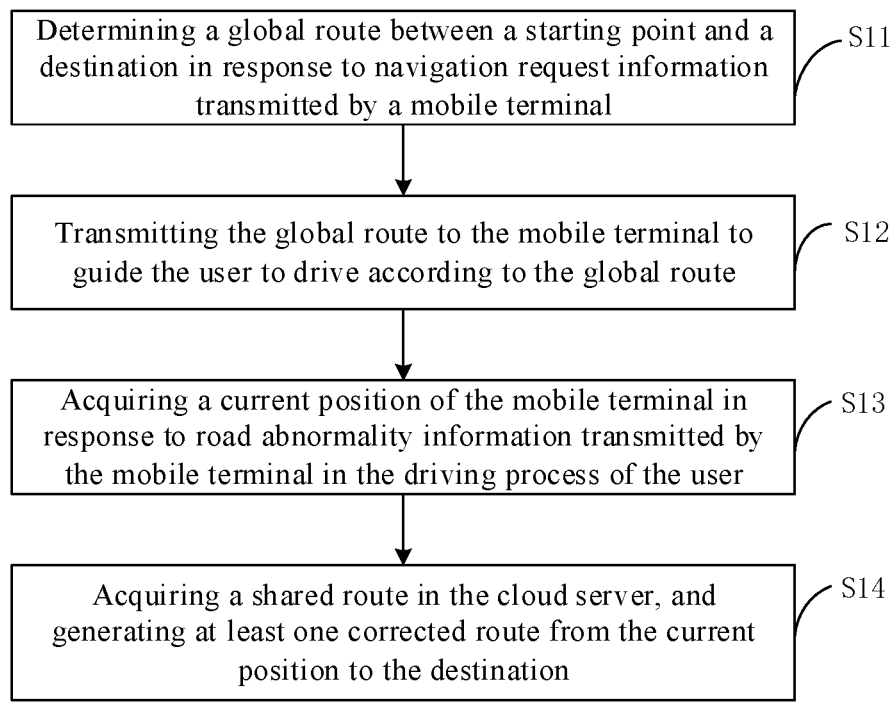
FIG. 1 is a schematic flow chart of a navigation method provided in some embodiments of the present disclosure.

FIG. 1 is a schematic flow chart of a navigation method provided in some embodiments of the present disclosure. The navigation method shown in FIG. 1 is applied to a cloud server, and as shown in FIG. 1, the navigation method includes the following steps S11 to S14 performed by the cloud server:

S11, determining a global route between a starting point and a destination in response to navigation request information transmitted by a mobile terminal, wherein the navigation request information includes at least information regarding the starting point and the destination.

The navigation request information may be generated by the mobile terminal according to information such as addresses of the starting point and the destination input by the user. The cloud server may generate the global route from a built-in map.

S12, transmitting the global route to the mobile terminal, to guide the user to drive according to the global route.

S13, acquiring a current position of the mobile terminal in response to road abnormality information transmitted by the mobile terminal in the driving process of the user.

The road abnormality information may be information transmitted by the mobile terminal when an abnormality occurs on the road ahead (for example, road repair, temporary blocking, road congestion, or the like). In one example, when the mobile terminal detects that the destination is not reached and the current position is not changed within a certain time, the road abnormality information is automatically generated. In another example, when the user finds that the road ahead is abnormal during the driving along the global route, the user may input an instruction to the mobile terminal, and the mobile terminal transmits the road abnormality information to the cloud server according to the instruction.

Alternatively, the road abnormality information may be information issued when a navigation route is missing (for example, navigation is completed but the final destination is not reached). For example, the destination is a building in a campus, and the global route provided by the cloud server is the starting point to the gate of the campus, at this time, the mobile terminal may transmit the road abnormality information to the cloud server, automatically or after receiving the instruction of the user.

The current position of the mobile terminal may be detected by the mobile terminal and transmitted to the cloud server. For example, the mobile terminal may acquire the current position in real time in a GPS manner or the like during the driving of the user.

S14, acquiring a shared route in the cloud server, and generating at least one corrected route from the current position to the destination. The corrected route is different from an original remaining route (a route remaining in the original global route), and the original remaining route is a part of the global route, which is located between the current position of the mobile terminal and the destination. Alternatively, the shared routes may be shared by other mobile terminals to the cloud server.

The corrected route is different from the original remaining route, that is, the corrected route does not overlap with at least a portion of the original remaining route. For example, when an abnormal road segment (e.g., a blocked road segment, a repaired road segment, etc.) is stored on the original remaining route, the corrected route may be a route that bypasses the abnormal road segment.

The shared routes shared by the other mobile terminals to the cloud server may be shared routes shared by the other mobile terminals to the cloud server recently (for example, the last week, the last month, or the like).

For example, during the user is driving along the global path, it is found at a position A that the road ahead is temporarily blocked: at this time, the mobile terminal transmits the road abnormality information to the cloud server, and the cloud server compares the shared routes of other mobile terminals with the original remaining route in response to the road abnormality information. For example, when a certain shared route passes through the current position of the mobile terminal and the destination and is not identical to the remaining route, a portion of the shared route between the current position and the destination may be used as a corrected route.

In the embodiment of the present disclosure, when the user is driving according to the global route originally planned by the cloud server, but halfway encounters a problem such as a road abnormality (for example, road repair, temporary blocking, road congestion, or the like) or a navigation abnormality (for example, the navigation is finished but the final destination is not reached), the cloud server may generate the corrected route from the current position to the destination according to the shared routes shared by other mobile terminals to the cloud server in response to the road abnormality information transmitted by the mobile terminal, so that the user may reach the destination along the corrected route, improving the user experience.

Figure 2:
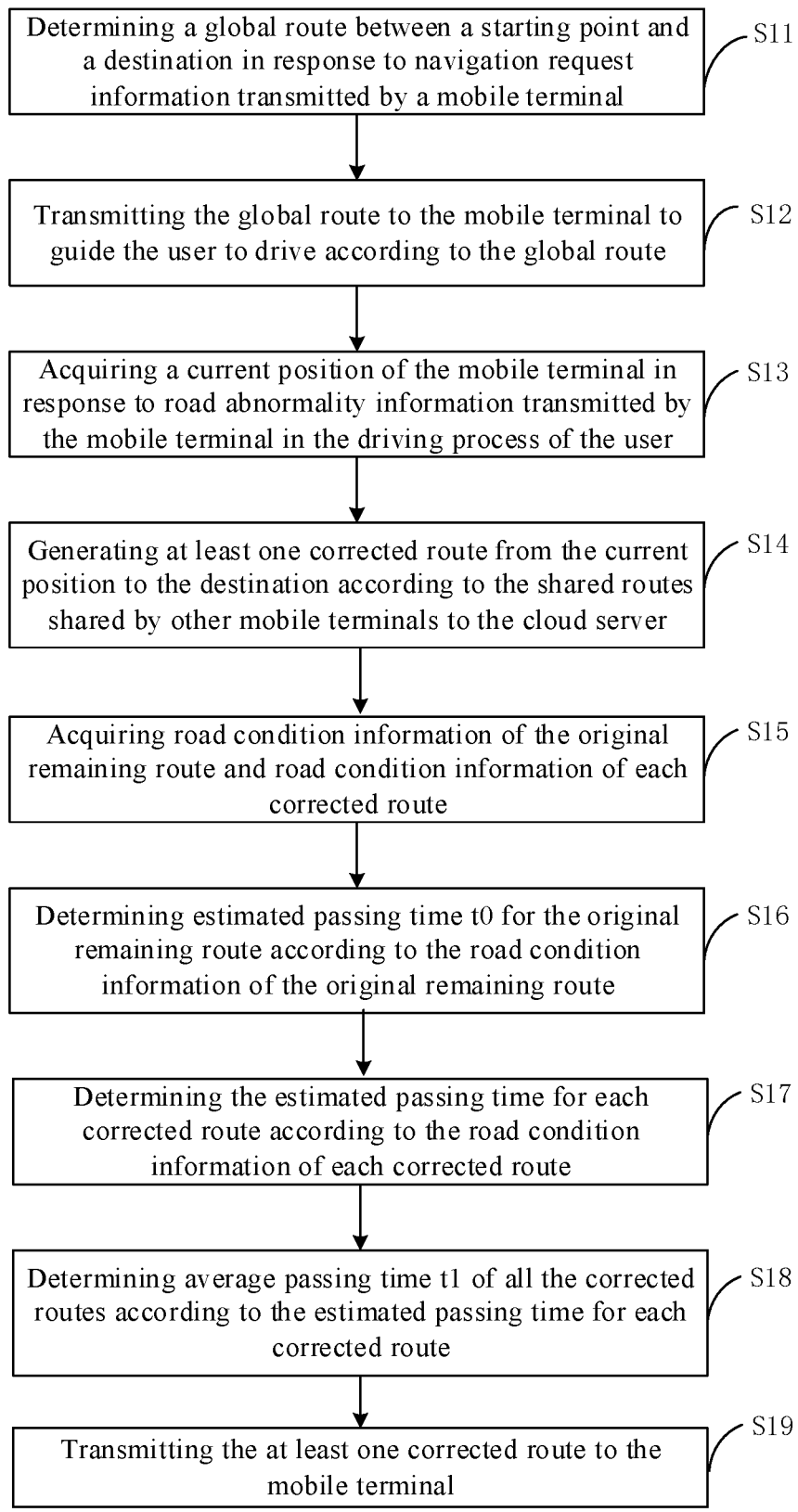
FIG. 2 is a schematic flow chart of a navigation method provided in further embodiments of the present disclosure.

FIG. 2 is a schematic flow chart of a navigation method provided in further embodiments of the present disclosure. As shown in FIG. 2, the navigation method includes:

S11, determining a global route between a starting point and a destination in response to navigation request information transmitted by a mobile terminal, wherein the navigation request information includes at least information regarding the starting point and the destination.

FIG. 3 is a schematic flow chart of step S11 provided in one example of the present disclosure. As shown in FIG. 3, in an example, the step S11 may specifically include: S11a, determining the global route between the starting point and the destination according to the map information stored in the cloud server in response to the navigation request information transmitted by the mobile terminal.

FIG. 4 is a schematic flow chart of step S11 provided in another example of the present disclosure. As shown in FIG. 4, in another example, the step S11 may specifically include: S11b1 to S11b3:

S11b1, determining a first alternative global route between the starting point and the destination according to the map information stored in the cloud server.

S11b2, selecting at least one second alternative global route from a plurality of shared routes shared by other mobile terminals to the cloud server, wherein the second alternative global route passes through a region defined by taking the destination as a center and a preset value as a radius.

The preset value may be determined according to actual requirements, for example, the preset value is 100 meters, 200 meters, or 500 meters.

S11b3, fitting the first alternative global route and at least one second alternative global route to obtain the global route.

For example, the first alternative global route is: a route from a location A to a location B through a location C: and the second alternative global route is: a route from a location D to the location B through the location C: a path between positions C and B in the second alternative global route is shorter than a path between positions C and B in the first alternative global route. In this case, a path between positions A and C in the first alternative global route and a path between positions C and B in the second alternative global route may be spliced together to obtain the global route.

Figure 5:
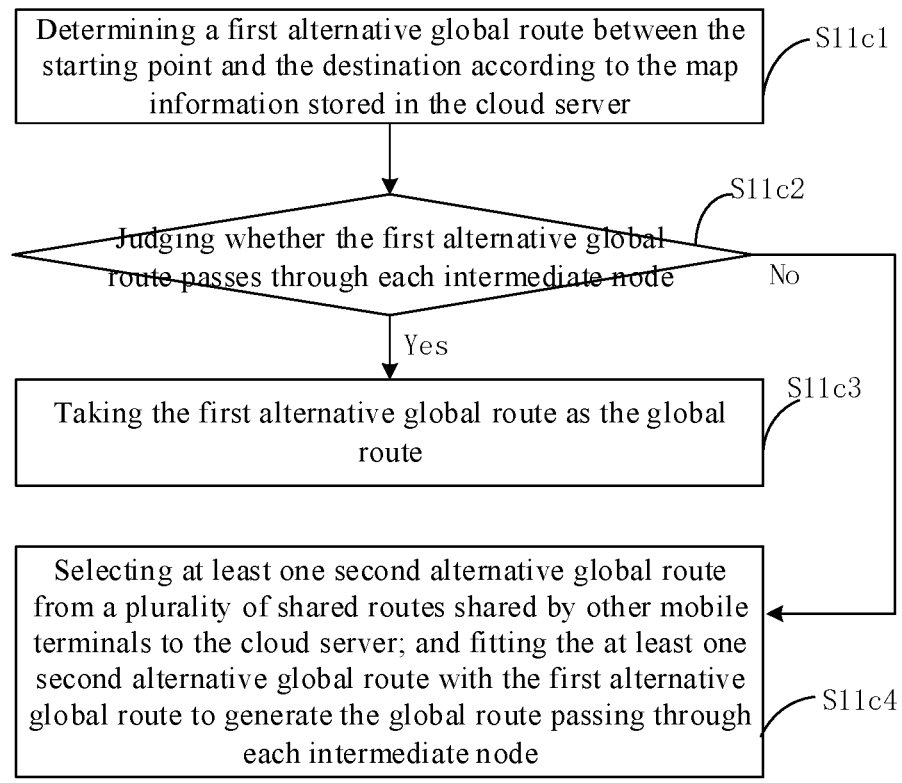
FIG. 5 is a schematic flow chart of step S11 provided in yet another example of the present disclosure.

In some scenarios, a user may wish to pass through one or more intermediate nodes during driving from the starting point to the destination, in which case, a corresponding instruction may be input to the mobile terminal, and the mobile terminal transmits the navigation request information to the cloud server according to the instruction, where the navigation request information includes, in addition to the information regarding the starting point and the destination, position information of at least one intermediate node between the starting point and the destination. The above step S11 may be implemented according to FIG. 5. FIG. 5 is a schematic flow chart of step S11 provided in yet another example of the present disclosure. As shown in FIG. 5, the step S11 includes the following steps S11c1 to S11c4:

S11c1, determining the first alternative global route between the starting point and the destination according to the map information stored in the cloud server.

S11c2, judging whether the first alternative global route passes through each intermediate node: if the first alternative global route passes through each intermediate node, S11c3 is performed. Otherwise, S11c4 is performed.

S11c3, taking the first alternative global route as the global route.

S11c4, selecting at least one second alternative global route from a plurality of shared routes shared by other mobile terminals to the cloud server: and fitting the at least one second alternative global route with the first alternative global route to generate the global route passing through each intermediate node.

In the embodiment shown in FIG. 5, the cloud server may generate the global route according to a specific requirement of a user, thereby improving the user experience.

With continued reference to FIG. 2, the navigation method further includes:

S12, transmitting the global route to the mobile terminal, to guide the user to drive according to the global route.

It should be noted that in step S11, a plurality of global routes may exist between the starting point and the destination, and the cloud server may determine an optimal (for example, the shortest time or the shortest distance) global route, or may transmit the plurality of global routes to the mobile terminal for selection by the user, and then transmit a corresponding global route to the mobile terminal according to the selection of the user.

S13, acquiring a current position of the mobile terminal in response to road abnormality information transmitted by the mobile terminal in the driving process of the user.

S14, generating at least one corrected route from the current position to the destination according to the shared routes shared by other mobile terminals to the cloud server. The corrected route is different from the original remaining route.

Figure 6:
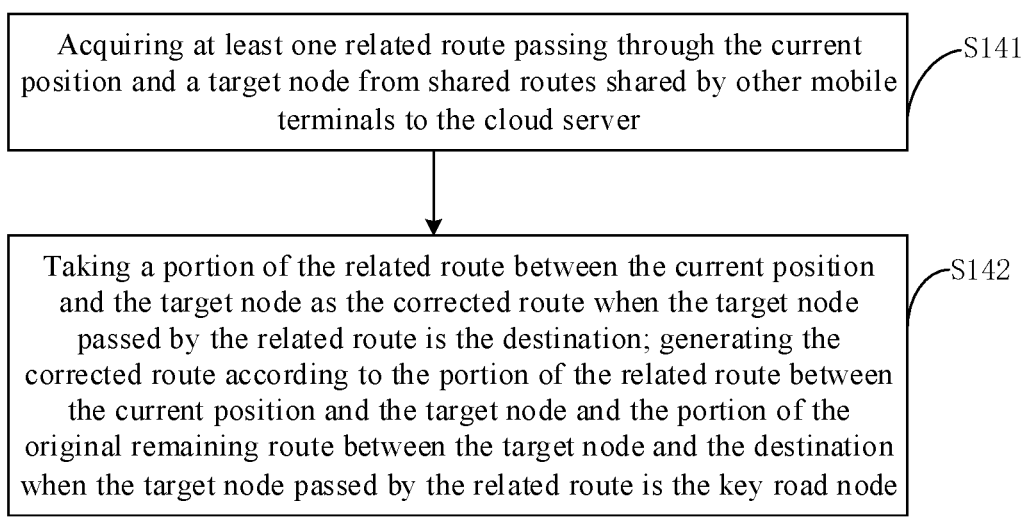
FIG. 6 is a schematic flow chart of step S14 provided in some embodiments of the present disclosure.

FIG. 6 is a schematic flow chart of step S14 provided in some embodiments of the present disclosure. As shown in FIG. 6, the step S14 may specifically include:

S141, acquiring at least one related route passing through the current position and a target node from shared routes shared by other mobile terminals to the cloud server, wherein the target node is the destination or a key road node positioned on the original remaining route, and the key road node is positioned in front of the destination and may be a road junction, a main trunk access, an entrance of the campus and other nodes.

S142, taking a portion of the related route between the current position and the target node as the corrected route when the target node passed by the related route is the destination: generating the corrected route according to the portion of the related route between the current position and the target node and the portion of the original remaining route between the target node and the destination when the target node passed by the related route is the key road node.

In some embodiments, before the S141, the method further includes: S140, detecting whether the abnormal road segment exists on the original remaining route, and if so, detecting the region where the abnormal road segment is located. In this case, the related route acquired in S141 needs to pass through the target node, and the target node should be located outside the abnormal road segment, so as to ensure that the corrected route obtained from the related route can completely avoid the abnormal road segment. "The target node is located outside the abnormal road segment" means that the target node has not any overlap with the abnormal road segment, or the target node is located at the end point of the abnormal road segment.

The abnormal road segment may be a congested road segment, a temporarily blocked road segment, or a road segment for repairing roads.

Figure 7:
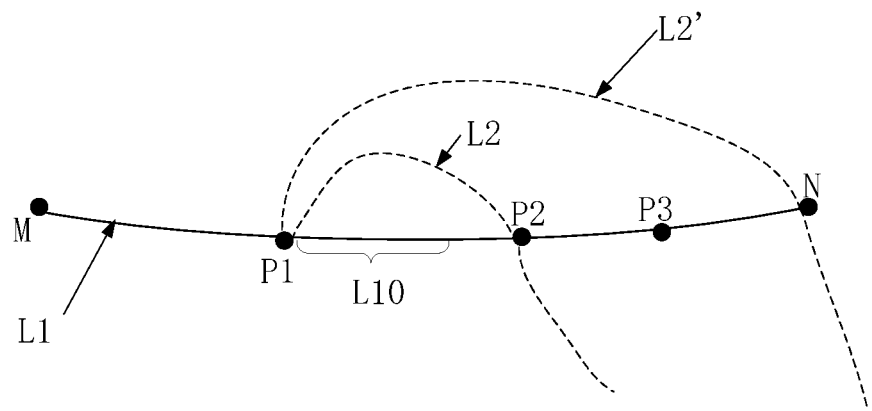
FIG. 7 is a schematic diagram of a global route and a corrected route provided in one example of the present disclosure.

FIG. 7 is a schematic diagram of a global route and a corrected route provided in one example of the present disclosure. As shown in FIG. 7, in an example, the starting point is M, the destination is N, and a road segment L10 on the global route L1 between M and N is a temporarily blocked road segment. When the user finds that a road abnormality exists at a position P1 during driving along the global route L1, the mobile terminal transmits the road abnormality information to the cloud server. The cloud server detects that an abnormal road segment L10 exists on the original remaining route, key road nodes P2 and P3 also exist, and in the route recently shared by other mobile terminals to the cloud server, a related route L2 passing through the position P1 and the key road node P2 and another related route L2' passing through the position P1 and the destination N exist. In this case, the cloud server may splice a portion of the related route L2 between P1 and P2 and a portion of the original remaining route between P2 and N to obtain a corrected route: a portion of the related route L2' located between P1 and N is taken as another corrected route.

Figure 8:
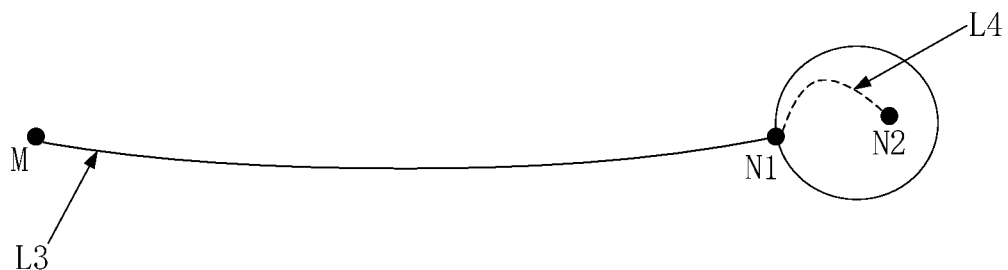
FIG. 8 is a schematic diagram of a global route and a corrected route provided in another example of the present disclosure.

FIG. 8 is a schematic diagram of a global route and a corrected route provided in another example of the present disclosure. As shown in FIG. 8, in another example, a starting point is M, a destination is a certain building N2 in a campus N1, and in a global route L3 initially determined by the cloud server, the starting point is M, and the ending point is an entrance N1 of the campus. When the user drives to the entrance N1 of the campus along the global route L3, the user finds that there is a road abnormality (that is, there is no path from the entrance N1 of the campus to the building N2 in the global route L3), and at this time, the mobile terminal transmits the road abnormality information to the cloud server. In this case, since the original remaining route is empty, the cloud server may use the destination N2 as a target node, and assuming that there is a related route L4 (shown by a dotted line) passing through the current position (i.e., the entrance N1 of the campus) and the destination N2 in the route recently shared by other mobile terminals to the cloud server, the cloud server may use a portion of the related route L4 located between the campus entrance N1 and the destination N2 as a corrected route.

With continued reference to FIG. 2, the navigation method further includes:

S15, acquiring road condition information of the original remaining route and road condition information of each corrected route.

The road condition information may include: obstacle information, traffic information, the number of traffic lights, route distance, historical traffic flow, and the like on a road. The road condition information may be detected by a road test device around the road and transmitted to the cloud server.

S16, determining estimated passing time t0 for the original remaining route according to the road condition information of the original remaining route.

In one example, if congestion occurs on the original remaining route, the cloud server may determine the estimated passing time for the original remaining route (an estimated time period required to pass through the original remaining route) according to the traffic, the number of traffic lights, and a length of the original remaining route. In another example, when a fault such as road repair or temporary blocking occurs on the original remaining route, the cloud server may determine estimated solution time for the fault according to the type of the fault, and further determine the estimated passing time for the original remaining route according to the estimated solution time for the fault, lengths of other road segments in the original remaining route, the traffic, and the number of traffic lights.

S17, determining the estimated passing time for each corrected route according to the road condition information of each corrected route.

S18, determining average passing time t1 of all the corrected routes according to the estimated passing time for each corrected route.

S190, judging whether a ratio of the estimated passing time to t0 the average passing time t1 for the original remaining route exceeds a preset threshold, if so, executing a step S19.

S19, transmitting the at least one corrected route to the mobile terminal.

The preset threshold may be determined according to actual needs, for example, the preset threshold is 1.5, 2, 3 or the like.

In some embodiments, the step S19 may specifically include:

S191a, generating reminding information according to the estimated passing time t0 and the average passing time t1 for the original remaining route, and transmitting the reminding information to the mobile terminal, so that the mobile terminal outputs the reminding information to remind a user of changing the route. For example, the mobile terminal may output reminding information in a text and/or voice, where the reminding information may be "the current route is abnormal, the estimated passing time is to, and the system recommends of changing the route with average passing time t1".

S191b, selecting one of all the corrected routes as a recommended route according to a preset rule, and transmitting the recommended route to the mobile terminal.

For example, the preset rule may be: taking the corrected route which takes the shortest time as the recommended route, or taking the corrected route which has the shortest distance as the recommended route.

It should be noted that the step S19 may or may not include the step S191a. When the step S19 includes the step S191a, the cloud server may directly execute the step S191b after executing the step S191a. Alternatively, the cloud server may transmit query information together with the reminding information to the mobile terminal, and when receiving confirmation information for changing the route transmitted from the mobile terminal, the cloud server may then perform S191b.

In some examples, the cloud server may transmit the reminding information and the recommended route to the mobile terminal at the same time, or may transmit the recommended route to the mobile terminal after transmitting the reminding information and receiving the confirmation information for changing the route from the user.

In other embodiments, the step S19 may specifically include steps S192a to S192d:

S192a, generating reminding information according to the estimated passing time t0 and the average passing time t1 for the original remaining route, and transmitting the reminding information to the mobile terminal, so that the mobile terminal outputs the reminding information to remind a user of changing the route. S192b, transmitting all the corrected routes to the mobile terminal.

S192c, selecting one of all the corrected routes as a recommended route in response to route selection information transmitted by the mobile terminal.

The route selection information may be generated by the mobile terminal in response to a selection instruction from the user. When the mobile terminal receives the corrected routes transmitted by the cloud server, all the corrected routes are displayed, and the user may select the corrected route according to the requirement and the preference of the user.

S192d, transmitting the recommended route to the mobile terminal.

Optionally, before step S192a, a characteristic tag of each corrected route may be generated according to the road condition information of each corrected route. When all the corrected routes are transmitted to the mobile terminal in step S192a, the characteristic tag of each corrected route may also be transmitted to the mobile terminal, so as to facilitate the selection by the user.

The characteristic tag may be a tag that characterizes characteristic information of the corrected route, such as "shortest time", "shortest distance", and "a less number of traffic lights".

It should be noted that the step S19 may or may not include the step S192a. When the step S19 includes the step S192a, the cloud server may directly execute the step S192b after executing the step S192a. Alternatively, the cloud server may transmit query information together with the reminding information to the mobile terminal, and when receiving confirmation information for changing the route transmitted from the mobile terminal, the cloud server may then perform S192b.

In some embodiments, the navigation method further includes: updating the stored map information according to the route shared by the mobile terminal and in response to navigation end information, so that the map information is perfected. The navigation end information is used for representing that the mobile terminal reaches the destination. The information may be transmitted to the cloud server by the mobile terminal, for example, after the mobile terminal detects that a vehicle driven by the user is turned off for a period of time, and the navigation end information is generated. Alternatively, the navigation end information may be generated by the cloud server. For example, the mobile terminal transmits the current position to the cloud server in real time, and when the cloud server judges that the current position is consistent with the destination, the navigation end information is generated.

Figure 9:
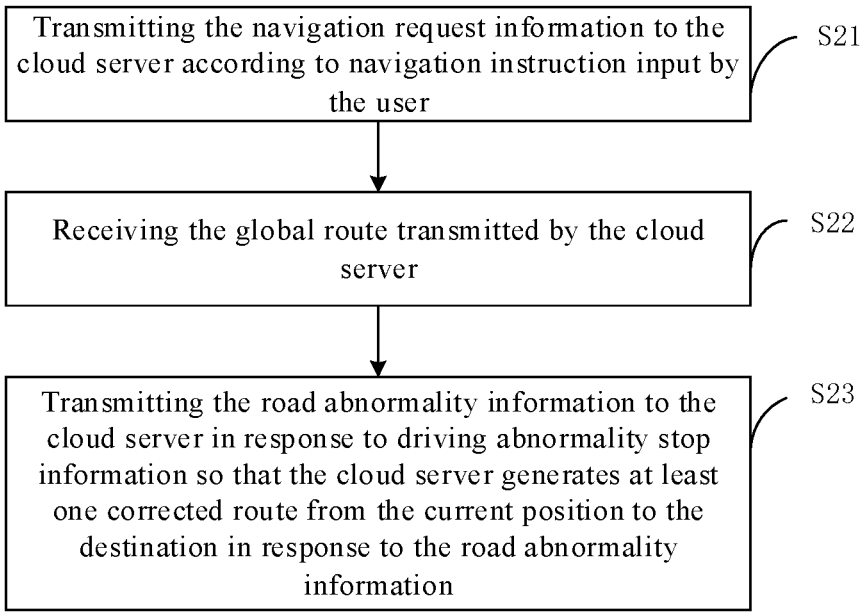
FIG. 9 is a schematic flow chart of a navigation method provided in further embodiments of the present disclosure.

FIG. 9 is a schematic flow chart of a navigation method provided in further embodiments of the present disclosure. The navigation method shown in FIG. 9 is applied to a mobile terminal. As shown in FIG. 9, the navigation method includes the following steps performed by the mobile terminal:

S21, transmitting the navigation request information to the cloud server according to navigation instruction input by the user, so that the cloud server may determine the global route between the starting point and the destination: the navigation request information includes at least information regarding the starting point and the destination.

S22, receiving the global route transmitted by the cloud server.

S23, transmitting the road abnormality information to the cloud server in response to driving abnormality stop information, so that the cloud server acquires the current position of the mobile terminal and the shared route in the cloud server in response to the road abnormality information to generate at least one corrected route from the current position to the destination.

The corrected route is different from the original remaining route, the original remaining route is a portion of the global route between the current position and the destination.

The driving abnormality stop information may be input to the mobile terminal by the user. Alternatively, the driving abnormality stop information may be generated by the mobile terminal, for example, when the mobile terminal detects that the destination is not currently reached but the current position has not changed within a period of time, the driving abnormality stop information may be generated. The current position may be transmitted by the mobile terminal to the cloud server.

In some embodiments, when the navigation method performed by the cloud server includes step S192b, the navigation method performed by the mobile terminal further includes:

S24, receiving the corrected route transmitted by the cloud server.

S25, outputting an instruction acquisition request to request the user to input a selection instruction.

S26, transmitting the route selection information to the cloud server in response to the selection instruction input by the user, so that the cloud server selects one of all the corrected routes as the recommended route.

S27, receiving the recommended route transmitted by the cloud server.

In some embodiments, the navigation method further includes:

S28, outputting shared request information in response to the navigation end information, to request a user to confirm whether to upload the actual driving route to the cloud server. The navigation end information is used for representing that the mobile terminal reaches the destination, and may be generated by the cloud server and transmitted to the mobile terminal, or may be generated by a detection module of the mobile terminal.

S29, transmitting at least a part of the actual driving route to the cloud server in response to confirmation sharing information (confirmation information for sharing) input by the user.

The confirmation sharing information may include a length of the route to be shared. The user may input the length of the route to be shared to the mobile terminal according to actual conditions. For example, the user may select to share the whole actual driving route to the cloud server, or may upload a portion of the actual driving route to the cloud server. For example, a road segment closest to the end point and having a length of 100 meters is uploaded to the cloud server.

Figure 10:
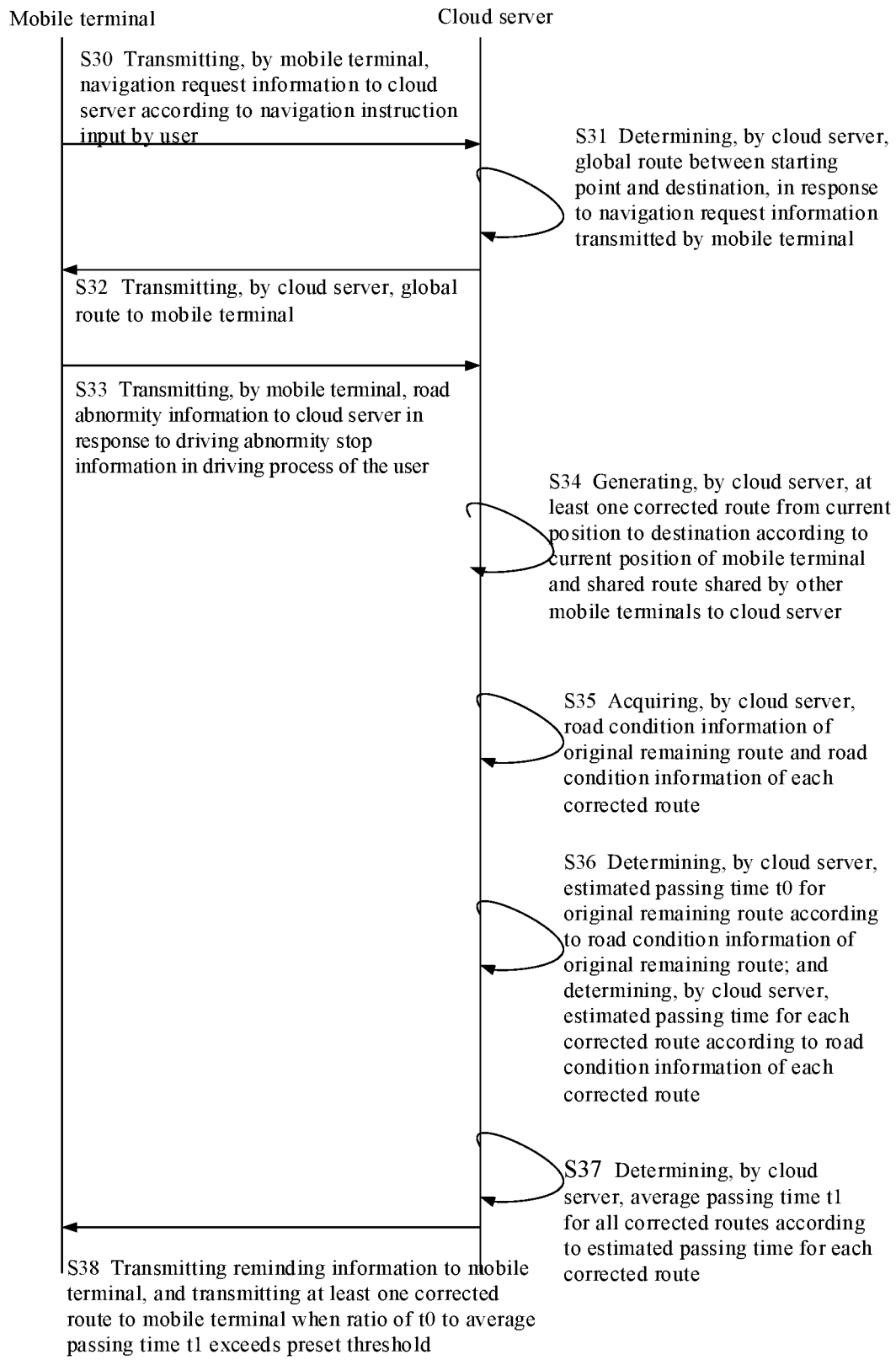
FIG. 10 is a schematic flow chart of a navigation method implemented by a navigation system provided in some embodiments of the present disclosure.

FIG. 10 is a schematic flow chart of a navigation method implemented by a navigation system provided in some embodiments of the present disclosure. As shown in FIG. 10, the navigation process includes:

S30, transmitting, by the mobile terminal, the navigation request information to the cloud server according to the navigation instruction input by the user, wherein the navigation request information at least includes information regarding the starting point and the destination.

S31, determining, by the cloud server, the global route between the starting point and the destination, in response to the navigation request information transmitted by the mobile terminal.

The specific manner of determining the global route by the cloud server has been described above, and is not described herein again.

S32, transmitting, by the cloud server, the global route to the mobile terminal so as to guide the user to drive along the global route.

S33, transmitting, by the mobile terminal, the road abnormity information to the cloud server in response to the driving abnormity stop information in the driving process:

S34, generating, by the cloud server, at least one corrected route from the current position to the destination according to the current position of the mobile terminal and the shared routes shared by other mobile terminals to the cloud server.

S35, acquiring, by the cloud server, the road condition information of the original remaining route and the road condition information of each corrected route.

S36, determining, by the cloud server, the estimated passing time to for the original remaining route according to the road condition information of the original remaining route: and determining, by the cloud server, the estimated passing time for each corrected route according to the road condition information of each corrected route.

S37, determining, by the cloud server, the average passing time t1 for all the corrected routes according to the estimated passing time for each corrected route.

S38, transmitting the reminding information to the mobile terminal, and transmitting at least one corrected route to the mobile terminal when the ratio of the to to the average passing time t1 exceeds the preset threshold.

The execution process of step S38 is described above with reference to S19, and is not described here again.

Figure 11:
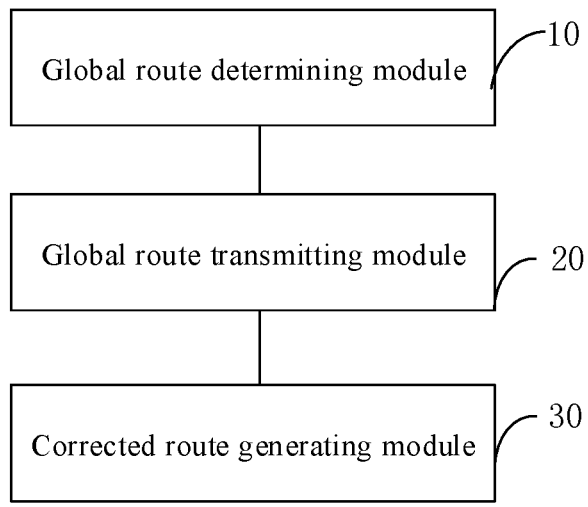
FIG. 11 is a schematic diagram of a cloud server provided in some embodiments of the present disclosure.

FIG. 11 is a schematic diagram of a cloud server provided in some embodiments of the present disclosure. The cloud server is configured to perform the above method illustrated in FIGS. 1 to 6. As shown in FIG. 11, the cloud server includes: a global route determining module 10, a global route transmitting module 20, a corrected route generating module 30.

The global route determining module 10 is configured to determine a global route between a starting point and a destination in response to navigation request information transmitted by a mobile terminal, wherein the navigation request information includes at least information regarding the starting point and the destination. The manner of determining the global route is described above, and is not described herein again.

The global route transmitting module 20 is configured to transmit the global route to the mobile terminal to guide a user to drive according to the global route.

The corrected route generating module 30 is configured to acquire a current position of the mobile terminal in response to road abnormality information transmitted by the mobile terminal in the driving process of the user: acquire a shared route in the cloud server, and generate at least one corrected route from the current position to the destination. The corrected route is different from an original remaining route, and the original remaining route is a part of the global route, which is located between the current position of the mobile terminal and the destination.

The manner of generating the corrected route by the corrected route generating module 30 is described above, and is not described herein again.

Figure 12:
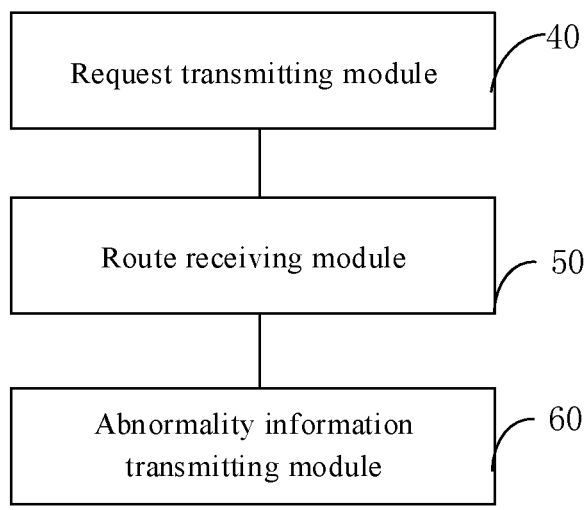
FIG. 12 is a schematic diagram of a mobile terminal provided in some embodiments of the present disclosure.

FIG. 12 is a schematic diagram of a mobile terminal provided in some embodiments of the present disclosure. The mobile terminal is configured to perform the method shown in FIG. 9. As shown in FIG. 12, the mobile terminal includes: a request transmitting module 40, a route receiving module 50 and an abnormality information transmitting module 60.

The request transmitting module 40 is configured to transmit the navigation request information to the cloud server according to navigation instruction input by the user, so that the cloud server may determine the global route between the starting point and the destination: the navigation request information includes at least information regarding the starting point and the destination.

The route receiving module 50 is configured to receive the global route transmitted by the cloud server.

The abnormality information transmitting module 60 is configured to transmit the road abnormality information to the cloud server in response to driving abnormality stop information, so that the cloud server acquires the current position of the mobile terminal in response to the road abnormality information and generate at least one corrected route from the current position to the destination according to the shared routes shared by other mobile terminals to the cloud server.

The original remaining route is a portion of the global route between the current position of the mobile terminal and the destination: the corrected route is different from the original remaining route.

In some embodiments, the route receiving module 50 is further configured to receive the corrected route transmitted by the cloud server. The mobile terminal further includes: an output module and an information transmitting module, wherein the output module is configured to output an instruction acquisition request to request a user to input a selection instruction. The information transmitting module is configured to transmit the route selection information to the cloud server in response to the selection instruction input by the user, so that the cloud server selects one of all the corrected routes as the recommended route. The route receiving module 50 is further configured to receive the recommended route transmitted by the cloud server.

In some embodiments, the output module is further configured to output shared request information in response to the navigation end information. The information transmitting module is further configured to transmit at least a part of the actual driving route to the cloud server in response to confirmation sharing information input by the user.

Figure 13:
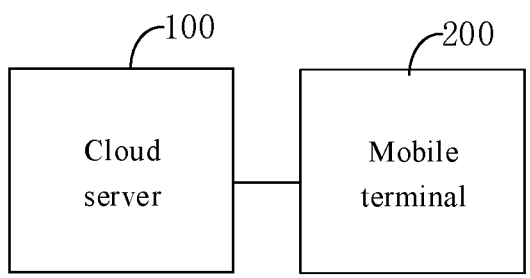
FIG. 13 is a schematic diagram of a navigation system provided in some embodiments of the present disclosure.

FIG. 13 is a schematic diagram of a navigation system provided in some embodiments of the present disclosure. The navigation system includes the cloud server shown in FIG. 11 and the mobile terminal shown in FIG. 12.

Figure 14:
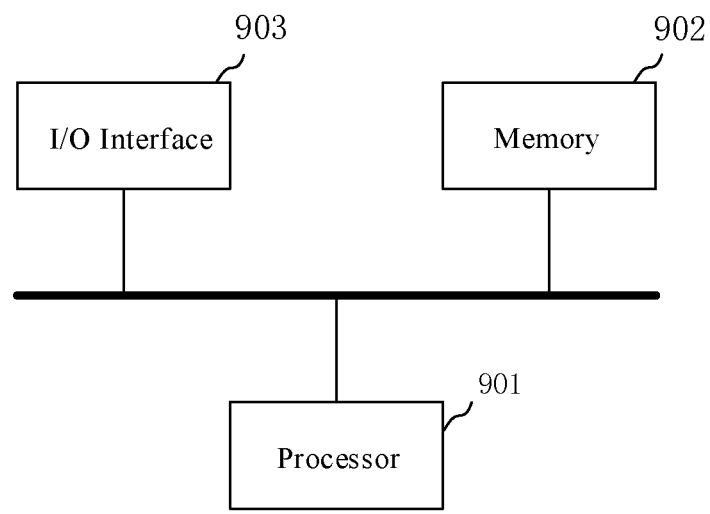
FIG. 14 is a schematic diagram of an electronic device provided in some embodiments of the present disclosure.

FIG. 14 is a schematic diagram of an electronic device provided in some embodiments of the present disclosure. As shown in FIG. 14, the electronic device includes: one or more processors 901: a memory 902 on which one or more programs are stored, which when executed by the one or more processors, cause the one or more processors to implement the navigation method described above: one or more I/O interfaces 903 connected between the one or more processors and the memory and configured to implement information interaction between the one or more processors and the memory.

Each processor 901 is a device with data processing capability, which includes, but is not limited to, a central processing unit (CPU), etc.; the memory 902 is a device with data storage capability, which includes, but is not limited to, random access memory (RAM, more specifically SDRAM, DDR, etc.), read only memory (ROM), electrically erasable programmable read only memory (EEPROM), flash memory (FLASH): the one or more I/O interfaces (read/write interfaces) 903 are connected between the one or more processors 901 and the memory 902 and are configured to enable information interaction between the one or more processors 901 and the memory 902, and include, but are not limited to, a data bus (Bus) etc. . . .

In some embodiments, the one or more processors 901, the memory 902, and the one or more I/O interfaces 903 are connected to each other via the bus, which in turn are connected to other components of a computing device.

The present embodiment also provides a computer-readable medium, on which a computer program is stored, which when executed by a processor, implements the navigation method provided by the present embodiment.

One of ordinary skill in the art will appreciate that all or some of the steps, systems, functional modules/units in the devices, disclosed above may be implemented as software, firmware, hardware, and suitable combinations thereof. In a hardware implementation, the division between functional modules/units mentioned in the above description does not necessarily correspond to the division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable medium, for example, a computer storage medium (or non-transitory medium) and a communication medium (or a transitory medium). The computer storage medium includes a volatile, nonvolatile, removable, non-removable medium implemented in any method or technology for storage of information, such as computer readable instructions, data structures, program modules or other data, as is well known to one of ordinary skill in the art. The computer storage medium includes, but is not limited to, RAM, ROM, EEPROM, FLASH, or other disk storage: CD-ROM, Digital Versatile Disk (DVD), or other optical disk storage; magnetic cassettes, magnetic tape, magnetic disk storage or other magnetic storage: any other medium which may be used to store the desired information and which may be accessed by a computer. In addition, the communication medium typically embodies computer readable instructions, data structures, program modules or other data in a modulated data signal such as a carrier wave or other transport mechanism and includes any information delivery medium, as is well known to one of ordinary skill in the art.

It should be noted that in this document, the terms "comprising", "including" or any other variation thereof are intended to cover a non-exclusive inclusion, such that a process, method, article, or apparatus that includes a list of elements does not include only those elements but may include other elements not expressly listed or inherent to such process, method, article, or apparatus. Without further limitation, an element defined by the phrase "including an . . . " does not exclude the presence of other identical elements in the process, method, article, or apparatus that includes the element.

It should be understood that, the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A computer-implemented navigation method for a cloud server, comprising:
   determining a global route between a starting point and a destination in response to navigation request information transmitted by a mobile terminal, wherein the navigation request information comprises at least information regarding the starting point and the destination;
   transmitting the global route to the mobile terminal, to guide a user to drive according to the global route;
   acquiring a current position of the mobile terminal in response to road abnormality information transmitted by the mobile terminal in a driving process of the user; and
   acquiring a shared route in the cloud server, and generating at least one corrected route from the current position to the destination; wherein the corrected route is different from an original remaining route, and the original remaining route is a part of the global route between the current position of the mobile terminal and the destination; and
   wherein the acquiring the shared route in the cloud server, and generating the at least one corrected route from the current position to the destination, comprises:
   acquiring at least one related route passing through the current position and a target node from the shared route in the cloud server, wherein the target node is the destination or a key road node on the original remaining route;
   taking a portion of the related route between the current position and the target node as the corrected route when the target node is the destination; and
   generating the corrected route according to the portion of the related route between the current position and the target node and the portion of the original remaining route between the target node and the destination when the target node is the key road node.

2. The computer-implemented navigation method of claim 1, wherein before the acquiring the at least one related route passing through the current position and the target node, the computer-implemented navigation method further comprises:
   detecting whether an abnormal road segment exists on the original remaining route; and detecting a region where the abnormal road segment is located in response to the abnormal road segment existing on the original remaining route; and
   wherein the target node passed by the related route is located outside the abnormal road segment.

3. The computer-implemented navigation method of claim 1, wherein the computer-implemented navigation method further comprises:
   acquiring road condition information of the original remaining route and road condition information of each corrected route;
   determining estimated passing time for the original remaining route according to the road condition information of the original remaining route;
   determining estimated passing time for each corrected route according to the road condition information of the corrected route;
   determining average passing time of all the corrected routes according to the estimated passing times for all the corrected routes; and
   transmitting the at least one corrected route to the mobile terminal in response to a ratio of the estimated passing time for the original remaining route to the average passing time exceeding a preset threshold.

4. The computer-implemented navigation method of claim 3, wherein the transmitting the at least one corrected route to the mobile terminal, comprises:
selecting one of all the corrected routes as a recommended route according to a preset rule, and transmitting the recommended route to the mobile terminal.

5. The computer-implemented navigation method of claim 3, wherein the transmitting the at least one corrected route to the mobile terminal, comprises:
transmitting all the corrected routes to the mobile terminal;
selecting one of all the corrected routes as a recommended route in response to route selection information transmitted by the mobile terminal; and
transmitting the recommended route to the mobile terminal.

6. The computer-implemented navigation method of claim 5, wherein the computer-implemented navigation method further comprises:
generating a characteristic tag of each corrected route according to the road condition information of the corrected route; and
wherein when all the corrected routes are transmitted to the mobile terminal, the characteristic tag of the corrected route is transmitted to the mobile terminal.

7. The computer-implemented navigation method of claim 3, wherein when the ratio of the estimated passing time for the original remaining route to the average passing time exceeds the preset threshold, the computer-implemented navigation method further comprises:
generating reminding information according to the estimated passing time for the original remaining route and the average passing time, and transmitting the reminding information to the mobile terminal.

8. The computer-implemented navigation method of claim 1, wherein the determining the global route between the starting point and the destination comprises:
determining the global route between the starting point and the destination according to map information stored in the cloud server.

9. The computer-implemented navigation method of claim 1, wherein the determining the global route between the starting point and the destination comprises:
determining a first alternative global route between the starting point and the destination according to map information stored in the cloud server;
selecting at least one second alternative global route from a plurality of shared routes in the cloud server, wherein the second alternative global route passes through a region defined by taking the destination as a center and a preset value as a radius; and
fitting the first alternative global route and the at least one second alternative global route to obtain the global route.

10. The computer-implemented navigation method of claim 1, wherein the navigation request information further comprises: position information of at least one intermediate node between the starting point and the destination;
the determining the global route between the starting point and the destination comprises:
determining a first alternative global route between the starting point and the destination according to map information stored in the cloud server;
judging whether the first alternative global route passes through each intermediate node;
taking the first alternative global route as the global route, in response to the first alternative global route passing through each intermediate node; and
selecting at least one second alternative global route from a plurality of shared routes in the cloud server; and
fitting the at least one second alternative global route with the first alternative global route to generate the global route passing through each intermediate node, in response to the first alternative global route not passing through each intermediate node.

11. The computer-implemented navigation method of claim 1, wherein the computer-implemented navigation method further comprises:
updating stored map information according to a route shared by the mobile terminal in response to navigation end information.

12. A computer-implemented navigation method for a mobile terminal, wherein the computer-implemented navigation method comprises:
transmitting navigation request information to a cloud server according to navigation instruction input by a user, so that the cloud server determines a global route between a starting point and a destination; wherein the navigation request information comprises at least information regarding the starting point and the destination;
receiving the global route transmitted by the cloud server; and
transmitting road abnormality information to the cloud server in response to driving abnormality stop information, so that the cloud server acquires a current position of the mobile terminal and a shared route in the cloud server in response to the road abnormality information to generate at least one corrected route from the current position to the destination by the following steps:
acquiring at least one related route passing through the current position and a target node from the shared route in the cloud server, wherein the target node is the destination or a key road node on the original remaining route;
taking a portion of the related route between the current position and the target node as the corrected route when the target node is the destination; and
generating the corrected route according to the portion of the related route between the current position and the target node and the portion of the original remaining route between the target node and the destination when the target node is the key road node;
wherein the at least one corrected route is different from an original remaining route, and the original remaining route is a portion of the global route between the current position and the destination.

13. The computer-implemented navigation method of claim 12, wherein the computer-implemented navigation method further comprises:
receiving the at least one corrected route transmitted by the cloud server;
outputting an instruction acquisition request to request the user to input selection instruction;
transmitting route selection information to the cloud server in response to the selection instruction input by the user, so that the cloud server selects one of the at least one corrected route as the recommended route; and
receiving the recommended route transmitted by the cloud server.

14. The computer-implemented navigation method of claim 12, wherein the computer-implemented navigation method further comprises:
outputting shared request information in response to navigation end information; and
transmitting at least a part of an actual driving route to the cloud server in response to confirmation sharing information input by the user.

15. A navigation system, comprising: a cloud server and a mobile terminal, wherein
the cloud server comprises:
a global route determining module configured to determine a global route between a starting point and a destination in response to navigation request information transmitted by a mobile terminal, wherein the navigation request information comprises at least information regarding the starting point and the destination;
a global route transmitting module configured to transmit the global route to the mobile terminal to guide a user to drive according to the global route; and
a corrected route generating module configured to acquire a current position of the mobile terminal in response to road abnormality information transmitted by the mobile terminal in a driving process of the user; acquire a shared route in the cloud server, and generate at least one corrected route from the current position to the destination by the following steps:
acquiring at least one related route passing through the current position and a target node from the shared route in the cloud server, wherein the target node is the destination or a key road node on the original remaining route;
taking a portion of the related route between the current position and the target node as the corrected route when the target node is the destination; and
generating the corrected route according to the portion of the related route between the current position and the target node and the portion of the original remaining route between the target node and the destination when the target node is the key road node;
wherein the corrected route is different from an original remaining route, and the original remaining route is a part of the global route between the current position of the mobile terminal and the destination;
the mobile terminal comprises:
a request transmitting module configured to transmit navigation request information to the cloud server according to navigation instruction input by the user, so that the cloud server determines the global route between the starting point and the destination; wherein the navigation request information comprises at least information regarding the starting point and the destination;
a route receiving module configured to receive the global route transmitted by the cloud server;
an abnormality information transmitting module configured to transmit road abnormality information to the cloud server in response to driving abnormality stop information, so that the cloud server acquires the current position of the mobile terminal in response to the road abnormality information, acquire the shared route in the cloud server, and generate at least one corrected route from the current position to the destination; and
wherein the corrected route is different from an original remaining route, and the original remaining route is a part of the global route between the current position of the mobile terminal and the destination.

16. An electronic device, comprising:
one or more processors;
a storage device having one or more programs stored thereon that, when executed by the one or more processors, cause the one or more processors to implement the computer-implemented navigation method of claim 1; and
one or more I/O interfaces connected between the one or more processors and the memory and configured to enable information interaction between the one or more processors and the memory.

17. A non-transitory computer-readable storage medium storming instructions which, when being executed by a processor, causes the processor to perform the computer-implemented navigation method of claim 1.

18. An electronic device, comprising:
one or more processors;
a storage device having one or more programs stored thereon that, when executed by the one or more processors, cause the one or more processors to implement the computer-implemented navigation method of claim 12; and
one or more I/O interfaces connected between the one or more processors and the memory and configured to enable information interaction between the one or more processors and the memory.

19. A non-transitory computer-readable storage medium storming instructions which, when being executed by a processor, causes the processor to perform the computer-implemented navigation method of claim 12.

* * * * *